United States Patent
Mueller et al.

[15] 3,637,478
[45] Jan. 25, 1972

[54] PROCESS FOR PRODUCTION OF ALIPHATIC ACIDS

[72] Inventors: William A. Mueller; Ronald Swidler, both of Pasadena, Calif.

[73] Assignee: Armour Industrial Chemical Company, Chicago, Ill.

[22] Filed: Apr. 3, 1968

[21] Appl. No.: 718,355

[52] U.S. Cl. ........................204/162, 204/158, 260/533 R
[51] Int. Cl. ........................................B01j 1/00, C07c 51/00
[58] Field of Search................204/158, 162; 260/533, 533 R

[56] References Cited

UNITED STATES PATENTS 3,347,763   10/1967   Coffey et al........................204/162 X

*Primary Examiner*—Benjamin R. Padgett
*Attorney*—Carl C. Batz and Alexander and Speckman

[57] ABSTRACT

Production of aliphatic acids by reaction of terminally unsaturated aliphatic compounds or monocyclic monounsaturated aliphatic compounds with formate ion in the presence of a free radical initiator. The aliphatic acids formed are useful in the production of lubricants, paper coating, rubber compounding or for the formation of derivatives such as soaps, amines and the like.

18 Claims, No Drawings

PROCESS FOR PRODUCTION OF ALIPHATIC ACIDS

BACKGROUND OF THE INVENTION

It has been known to react alpha-olefins and formamides to form mixtures of N-alkyl formamide and long chain acid amides. Further, it has been known to react alpha-olefins with methyl formate to form the esters of telomeric fatty acids and formic esters of telomeric secondary alcohols. Such prior reactions of alpha-olefins with formate compounds having hydrogen containing substituents have been of no commercial value for the production of aliphatic acids. These reactions have produced mixtures of poorly defined products, principally mixtures of variously substituted formate compounds.

It is an object of this invention to provide a process for the selective production of aliphatic acids.

It is a further object of this invention to furnish a process for the production of aliphatic acids by the reaction of aliphatic alpha-olefinic compounds and monocyclic monounsaturated aliphatic compounds with formate ions under free radical conditions.

A still further object of this invention is to provide a process for the production of aliphatic acids from alpha-olefins by the reaction of the alpha-olefin with formate ion in the presence of a peroxide free radical initiator.

Additional objects and advantages will become apparent in the following description and specific examples.

These objects are attained by the process comprising reacting a terminally unsaturated or monocyclic monounsaturated compound with a formate ion in the presence of a suitable source of free radicals under free radical conditions in a homogeneous medium such as an aqueous alcoholic solvent system.

An embodiment of our invention may be illustrated by the chemical equation

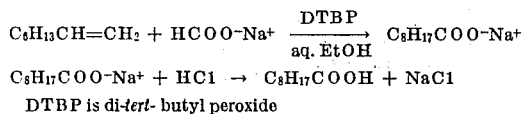

$C_8H_{17}COO^-Na^+ + HCl \rightarrow C_8H_{17}COOH + NaCl$

DTBP is di-*tert*-butyl peroxide

Unsaturated aliphatic compounds suitable for use in the process of our invention include terminal nonconjugated unsaturated olefinic compounds and monocyclic monounsaturated aliphatic compounds.

One preferred subclass of unsaturated compounds for use in our invention include alpha-olefins having from two to 20 carbon atoms and substituted alpha-olefins wherein the substituents are selected from carboxy, fluoro, chloro, hydroxy, alkali metal carboxylate, and alkyl carboxylate. Linear alpha-olefins suitable for our process include ethylene, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nondecene, 1-eicosene, 1-heneicosene, and 1-docosene. Commercially available mixtures of aliphatic olefins suitable for the process of our invention include standard olefin cuts such as alpha-olefins $C_{7-9}$, $C_{9-10}$, $C_{11-14}$, and $C_{15-20}$. Normal and branched chain alpha-olefins are suitable reactants. Branched chain alpha-olefins suitable for our process include 2,4,4-trimethyl-pentene-1, 4-methyl pentene-1, 2-ethyl butene-1, 2-methyl butene-1, 4-methyl decene-1, 2-ethyl hexene-1, 5-ethyl nonene-1, and 6-methyl heptene-1. The above-mentioned alpha-olefins having substitutions selected from the group consisting of carboxy, fluoro, chloro, hydroxy, alkali metal carboxylate and alkyl carboxylate are suitable for use in our process. By the term alkali metal carboxylate we include the radicals —COONa, —COOK, and COOLi. By the term alkyl carboxylate we include —COOR wherein R is an alkyl radical having from one to six carbons. Especially suitable are methyl and ethyl carboxylate substitutions. Tetrafluoroethylene may be used to produce good yields of tetrafluoropropionic and octofluorovaleric acid.

Diterminally unsaturated olefins wherein the unsaturation is nonconjugated are suitable for use in the process of our invention. Suitable dienes include 1,7-octadiene, 2,6-dimethyl-1,7-octadiene, and 1,5-hexadiene.

Monocyclic monounsaturated aliphatic compounds are suitable for the process of our invention. Specific suitable cyclic compounds include cyclohexene, cyclopentene, and cycloheptene. The cyclic compounds may be substituted with a carboxy, fluoro, chloro, hydroxy, nonconjugated alkali metal carboxylate or nonconjugated alkyl carboxylate group.

Formate ions may be supplied by using alkali metal salts of formic acid, especially by use of the sodium and potassium salts of formic acid. The formate ion may be provided by any convenient source which ionizes upon dissolution in the reaction solvent.

The process of this invention is advantageously conducted in a homogeneous medium, in which the source of formate ions, the olefin, and the initiator are dissolved. The reaction will proceed under conditions where a portion of reactant may not be in the homogeneous system. The solvent must be sufficiently polar to dissolve the source of formate ions, while having sufficient solvent power to accommodate the required concentration of olefin. Aqueous solutions of aliphatic alcohols having from one to six carbon atoms are especially satisfactory as solvents. Aqueous solutions of methanol and ethanol are especially preferred. The concentration of alcohol in water may vary from about 40 to about 90 percent, from about 60 to 80 percent being especially preferred.

The reaction between the unsaturated compound and formate ion may be initiated by free radicals which may be obtained from any suitable source including chemical or photoinitiators, known in the art as free radical initiators. Chemical free radical initiators are selected to afford a continuous supply of radicals throughout the reaction period. Therefore, an initiator is selected so that under reaction conditions of time and temperature not more than two to four half lives of the initiator elapses. Specific chemical initiators which are especially useful in the invention include dialkyl peroxides such as di-tert-butyl peroxide and dicumyl peroxide, and peresters such as tert-butyl perbenzoate. Suitable concentrations of the chemical initiators are from 0.1 to 2 mole percent based upon the formate ion concentration. Photoinitiation such as ultraviolet radiation may be used alone or in conjunction with photosensitizers such as dialkyl ketones and organic peroxides. Diethyl ketone is particularly useful as a photosensitizer when using Quartz Mercury resonance lamps.

The reaction may be conducted by dissolving the olefinic and formate reactants in aqueous alcohols. Concentration of formate ion and olefin may be adjusted to produce maximum yields of the desired product. In general, a high mole ratio of formate to olefin tends to produce 1:1 adducts, and a low mole ratio tends to produce telomeric acids. However, these ratios may vary according to the reactivity of the olefinic reactant. Certain olefins produce substantial amounts of 1:1 adducts each at low ratios of formate ion to olefin while others produce telomeric acids even at high formate to olefin ratios. Thus, the ratios of formate ion to olefin may be varied over wide limits to derive high yields of desired product. It is preferred that the formate ion be present in an excess of from about 5 to 20 moles of formate ion per mole of olefin. Lower amounts of formate ion relative to olefin present tend to promote undesirable side reactions, especially telomerization of the olefin. Molar amounts of formate ion relative to olefin of greater than 20 to 1 may be used to promote formation of the 1 to 1 adduct, but become economically undesirable. When the olefinic material is a solid or liquid it may be simply added to the aqueous alcohol medium to provide a suitable concentration relative to the formate ion. When the olefinic material is gaseous, the gas may be charged into the closed reaction vessel after flushing with nitrogen. The chemical initiator is added in a mole percent of from 0.1 to 2, based upon formate ion concentration. The formate ion, olefin, and chemical initiator in aqueous alcohol solution is flushed with nitrogen to remove residual oxygen from the system, sealed in the vessel, stirred and heated to reaction temperature suitable to the nature of the initiator employed, as is well known in the art, at autogenous pressure until the reaction is substantially completed. Preferred temperatures are from about 120° to 160° C., when di-tert-butyl peroxide or tert-butyl perbenzoate is used as an initiator. When the olefinic material is gaseous, such as ethylene, the formate ion producing substance and chemical initiator may be added to the aqueous alcohol in an autoclave, flushed with nitrogen, and then the gaseous olefin added to a pressure affording the desired concentration of olefin in the reaction mixture, usually from about 50 to 1,000 p.s.i.g., followed by stirring and heating. The olefin and/or the source of free radicals may be added gradually or stepwise throughout the course of the reaction in order to maintain a favorable rate of formate ion to olefin mole ratio.

When the reaction is conducted in the presence of irradiation, the formate ion producing material and an olefinic material may be dissolved in aqueous alcohol, and alternatively, ultraviolet radiation either alone or in conjunction with sensitizer may be used at convenient temperatures of between 0° to 120° C. The reaction should be continued until the olefinic material is substantially consumed by the reaction.

The following examples are presented to illustrate our invention.

EXAMPLE I

Sodium formate, 1-octene, and di-tert-butyl peroxide in mole ratios of 100:10:1 were added to and mixed with 50 percent aqueous ethanol in a glass bomb. The solution of reactants and free radical initiator in aqueous ethanol were flushed with nitrogen, sealed and heated to and maintained at about 130° C. for 15 hours. The bomb and contents were then cooled to room temperature, the contents transferred to a steam distillation apparatus, and the material steam distilled to remove excess ethanol and higher aliphatic alcohols until the distillant became clear. The residue made up principally of an aqueous solution of sodium pelargonate, was then acidified with hydrochloric acid and steam distilled yielding pelargonic acid in 50 percent yield, based upon 1-octene reactant. The products were analyzed and identified by infrared and gas chromatographic data compared with synthesized pure sample materials.

EXAMPLE II 27.2 grams sodium formate, 3.3. grams 1-hexene, 0.36 gram di-tert-butyl peroxide and 100 ml. 70 percent methanol were added to a 300 cc. stainless steel stirred autoclave. The mixture was flushed with nitrogen and heated to and maintained at 130° C. for 15 hours. Using the same recovery technique as described in example I, heptanoic acid was obtained in 23 percent yield, determined by analysis described in example I.

EXAMPLE III 27.2 grams sodium formate, 7.3 grams undecylenic acid, 1.6 grams sodium hydroxide, and 1 gram of di-tert-butyl peroxide were added to 100 ml. 50 percent aqueous methanol in a glass bomb. The mixture was flushed with nitrogen, sealed and heated to and maintained at about 140° C. for 15 hours. The bomb and contents were cooled to room temperature, acidulated with hydrochloric acid, and 1,12-dodecanedioic acid was recovered by filtration. Eighty percent crude mass yield, based upon undecylenic acid reactant was obtained. The product melted at 117°–126° C., and had a neutralization equivalent of 130 (119 theoretical).

EXAMPLE IV

Three hundred eighty six grams sodium formate, 8.25 grams di-tert-butyl peroxide and 1,421 ml. 70 percent aqueous methanol were added to a 1-gallon stainless steel stirred autoclave. The mixture was flushed with nitrogen, sealed, and ethylene was added to a pressure of 750 p.s.i.g. The reaction mixture was stirred and heated at about 130° C. for about 18 hours. The contents were cooled to room temperature and a pressure of 400 p.s.i.g. was observed. The autoclave was opened and the contents transferred to a steam distillation apparatus and steam distilled until the distillant was clear to remove excess methyl and higher aliphatic alcohols. The residue was acidulated with hydrochloric acid and the acid solvent extracted. The acids were then esterified with ethanol and separated from insoluble and nonesterfiable materials by filtration and washing with sodium carbonate solution. The yield of aliphatic acids was 88 percent based upon ethylene consumed. The distribution of ethyl esters obtained as determined by gas chromatographic analysis was as follows:

| Ethyl propionate | 31.3% |
|---|---|
| Ethyl valerate | 29 |
| Ethyl enanthate | 16 |
| Ethyl pelargonate | 11 |
| Ethyl hendecanoate | 7 |
| Ethyl tridecanoate | 5 |

EXAMPLE V 27.2 grams sodium formate, 0.36 gram di-tert-butyl peroxide and 100 ml. 70 percent aqueous methanol were added to a 300 cc. stainless steel autoclave. The mixture was flushed with nitrogen, pressurized with ethylene to 750 p.s.i.g., heated to and maintained at about 130° C. for about 15 hours. The contents were cooled to room temperature, transferred to a steam distillation apparatus and steam distilled until the distillant was clear to remove excess methyl and higher aliphatic alcohols. Recovery and purification was accomplished as described in example IV. A mixture of telomeric aliphatic acid was obtained in 75 percent yield, based on ethylene consumed.

EXAMPLE VI 27.2 grams sodium formate, 0.36 gram di-tert-butyl peroxide and 100 ml. 50 percent aqueous ethanol were added to a 300 cc. stainless steel stirred autoclave. The mixture was flushed with nitrogen and ethylene was added to a pressure of 750 p.s.i.g. The mixture was stirred and heated to and maintained at about 130° C. for about 18 hours. The product was isolated and purified as in example IV, yielding a mixture of linear primary aliphatic acids containing three, five, seven, nine, 11 and 13 carbon atoms produced in varying amounts generally decreasing with increasing chain length. The yield based upon amount of ethylene consumed was 67 percent.

EXAMPLE VII 0.4 mole potassium formate, 0.36 gram di-tert-butyl peroxide and 100 ml. 70 percent aqueous methanol were added to a 300 cc. stainless steel stirred autoclave. The mixture was flushed with nitrogen and ethylene was added to a pressure of 750 p.s.i.g. The mixture was stirred and heated to and maintained at about 130° C. for about 18 hours. The product was isolated and purified as in example IV, yielding a mixture of linear primary aliphatic acids containing three, five, seven, nine, 11 and 13 carbon atoms produced in varying amounts generally decreasing with increasing chain length. The yield based upon amount of ethylene consumed was 81 percent.

EXAMPLE VIII 0.4 mole of sodium formate, 0.70 gram of di-tert-butyl peroxide and 100 ml. 70 percent aqueous methanol were added to a 300 cc. stainless steel stirred autoclave. The mixture was flushed with nitrogen and 30 grams of propylene were added. The mixture was heated and stirred to and maintained at about 130° C. for 18 hours. The product was isolated and purified as in example IV, yielding 2.9 grams of a mixture of linear methyl branched primary aliphatic acids containing four, seven, 10 and 13 carbon atoms produced in varying amounts generally decreasing with the increasing chain lengths.

EXAMPLE IX 0.4 mole sodium formate, 0.5 gram of di-tert-butyl peroxide, and 100 ml. of 70 percent aqueous methanol were added to a 300 cc. stainless steel stirred autoclave. The mixture was flushed with nitrogen and tetrafluoroethylene was added to a pressure of 380 p.s.i.g. (approximately 0.4 mole). The mixture was then stirred and heated to and maintained at about 130° C. for 3 hours. The contents were cooled to room temperature, after which the pressure was less than about 50 p.s.i.g. The homogeneous reaction mixture was acidified, extracted with ether, dried and distilled, yielding 35.5 grams of product having a boiling range of 60°/760 mm.–62°/25 mm. The infrared spectra and boiling data show the main products to be the $C_3$ and $C_5$ fluorinated aliphatic acids with small amounts of the corresponding alcohols.

EXAMPLE X

Two-tenths mole sodium formate and 0.02 mole 1-octene were dissolved in 75 ml. 60 percent aqueous ethanol. 0.5 ml. diethyl ketone was added and the mixture was irradiated with a Quartz Mercury resonance lamp having about 2 watts output at ambient temperature for 6 hours. 0.5 ml. amounts of additional diethyl ketone were added at about 2-hour intervals during irradiation. The product was isolated and purified as in example I and pelargonic acid was obtained in about 10 percent yield.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for the production of aliphatic acids comprising reacting an unsaturated aliphatic compound selected from the group consisting of
   A. terminally unsaturated nonconjugated linear olefins having two to 20 carbon atoms and their substituted derivatives having substituents selected from the group consisting of carboxy, fluoro, chloro, hydroxy, alkyl metal carboxylate and alkyl carboxylate; and
   B. monocyclic, monounsaturated cyclic compounds and their substituted derivatives having substituents selected from the group consisting of carboxy, fluoro, chloro, hydroxy, nonconjugated alkyl metal carboxylate and nonconjugated alkyl carboxylate;
with formate ion in the presence of free radicals produced by irradiation with ultraviolet light or the addition of a chemical initiator in a homogeneous medium at a pressure of about 50 to 1,000 p.s.i.g. and at a temperature of about 0° to 160° C.; said formate ion being present in excess of about 5 moles of formate ion per mole of said unsaturated aliphatic compound.

2. The process of claim 1 wherein said unsaturated compound is an alpha-olefin having from two to 20 carbon atoms.

3. The process of claim 2 wherein said alpha-olefin is substituted with a substituent selected from the group consisting of carboxy, fluoro, chloro, hydroxy, alkali metal carboxylate and alkyl carboxylate.

4. The process of claim 3 wherein said alpha-olefin is a diterminally unsaturated olefin, wherein said unsaturation is nonconjugated.

5. The process of claim 1 wherein said unsaturated compound is cyclohexene.

6. The process of claim 1 wherein said homogeneous medium comprises an aqueous alcohol solvent system wherein said alcohol is an aliphatic alcohol having from one to six carbon atoms in a concentration of from about 40 to 90 weight percent.

7. The process of claim 6 wherein said alcohol is selected from the group consisting of methanol and ethanol, and wherein said concentration is from about 60 to 80 weight percent.

8. The process of claim 1 wherein said free radicals are generated by an initiator selected from the group consisting of dialkyl peroxides and peresters.

9. The process of claim 8 wherein said initiator is selected from the group consisting of di-tert-butyl peroxide and tert-butyl perbenzoate, and the concentration of said initiator is from 0.1 to 2 mole percent, based upon the formate ion concentration.

10. The process of claim 1 wherein said free radicals are generated by ultraviolet radiation.

11. The process of claim 1 wherein said formate ion is present in from about 5 to 20 moles of formate ion per mole of said unsaturated compound.

12. The process of claim 1 wherein said reaction is carried out at temperatures of from about 100° to 180° C. and at autogenous pressures.

13. The process of claim 9 wherein said temperatures are from about 120° to 160° C.

14. The process of claim 1 wherein said unsaturated compound is gaseous, and is added to a reaction vessel to a pressure from about 50 to 1,000 p.s.i.g.

15. The process of claim 1 wherein linear alpha-olefins having from 11 to 14 carbon atoms are reacted with formate ion in the presence of from 0.1 to 2 mole percent di-tert-butyl peroxide in an aqueous solution of ethanol, the concentration of ethanol being from about 60 to 80 percent, at from 120° to 160° C., said formate ion being present in from 5 to 20 moles of formate ion per mole of said olefin.

16. The process of claim 1 wherein octene-1 is reacted with formate ion in the presence of from 0.1 to 2 mole percent di-tert-butyl peroxide in an aqueous solution of ethanol, the concentration of ethanol being from about 60 to 80 percent, at from 120° to 160° C., said formate ion being present in from 5 to 20 moles of formate ion per mole of said octene-1.

17. The process of claim 1 wherein ethylene is reacted with formate ion in the presence of from 0.1 to 2 mole percent di-tert-butyl peroxide in an aqueous solution of ethanol, the concentration of ethanol being from about 60 to 80 percent, at from 120° to 160° C., wherein said ethylene is added to a pressure of from about 50 to 1,000 p.s.i.g. and the reaction is conducted at autogenous pressures.

18. The process of claim 1 wherein tetrafluoroethylene is reacted with formate ion in the presence of from 0.1 to 2 mole percent di-tert-butyl peroxide in an aqueous solution of 60 to 80 percent ethanol, wherein said tetrafluoroethylene is added to a pressure of from about 50 to 1,000 p.s.i.g. and the reaction is conducted at autogenous pressures.

* * * * *